United States Patent
Brewer

[15] 3,660,038
[45] May 2, 1972

[54] INTEGRATED GARBAGE PROCESSING SYSTEM

[72] Inventor: John C. Brewer, Salt Lake City, Utah

[73] Assignee: Garbalizer Corporation of America, Salt Lake City, Utah

[22] Filed: Aug. 7, 1970

[21] Appl. No.: 61,992

Related U.S. Application Data

[62] Division of Ser. No. 707,910, Feb. 5, 1968, abandoned.

[52] U.S. Cl. ..........................23/259.1, 209/387, 214/44 R, 241/101 R
[51] Int. Cl. .........................................................B65g 67/24
[58] Field of Search .......................214/44, 44 A, 45, 46, 49; 23/259.1; 49/25; 209/387; 241/101 R

[56] References Cited

UNITED STATES PATENTS

| | | | |
|---|---|---|---|
| 3,248,176 | 4/1966 | Pierson | 23/259.1 |
| 3,075,660 | 1/1963 | Kelley | 214/49 |
| 879,839 | 2/1908 | Sanderson | 198/222 |
| 3,368,305 | 2/1968 | Piekarski | 49/25 X |

Primary Examiner—Robert G. Sheridan
Attorney—M. Ralph Shaffer

[57] ABSTRACT

The present invention provides a system and method for processing municipal refuse or garbage into useable fertilizer products. Suitable means are preferably incorporated for separating metals from the refuse and for processing the same into commercially deliverable metal products such as ingots. In a preferred form of the invention the system or method is used in conjunction with a municipal sewage treatment plant wherein the liquid and sludge phases thereof are utilized in the system and method for milling and also for enriching the slurry developed in the system and method, for ultimate processing as a useable fertilizer product.

4 Claims, 8 Drawing Figures

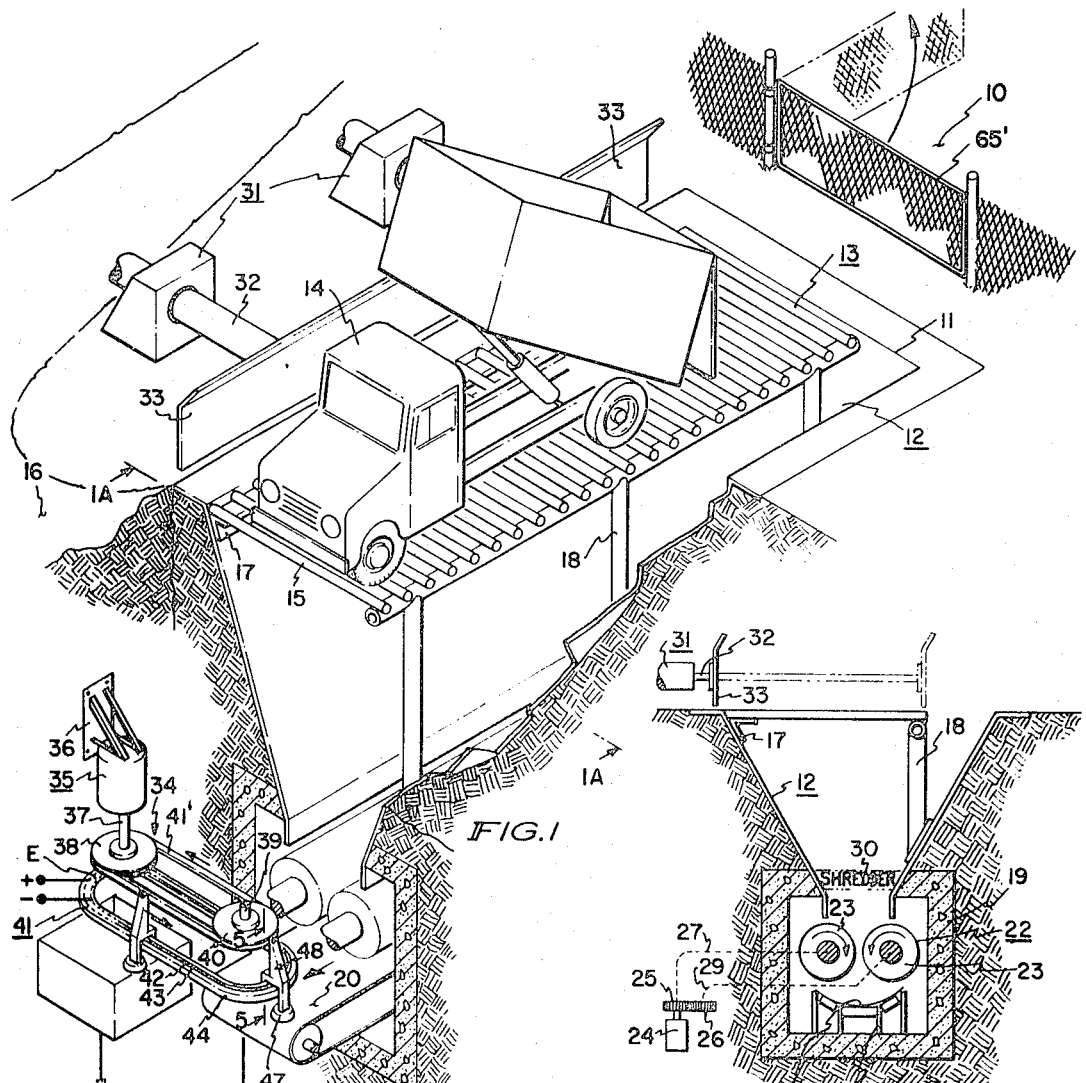
FIG.1
FIG.1A
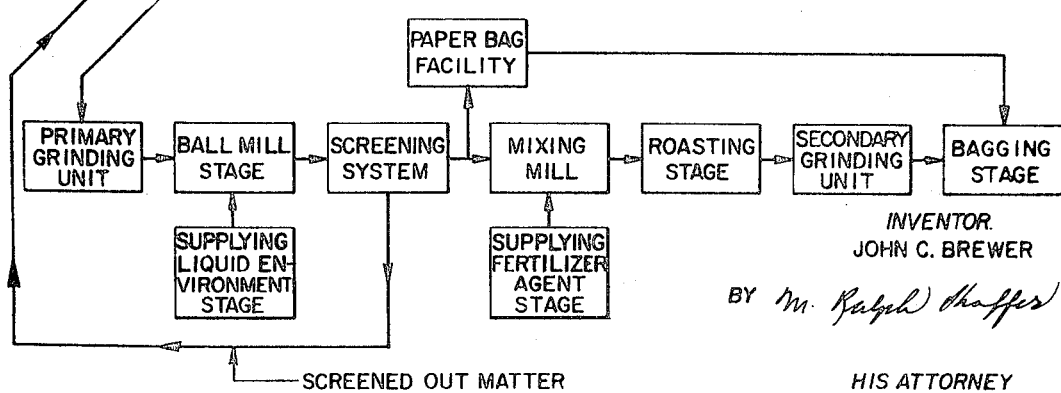
INVENTOR.
JOHN C. BREWER
BY M. Ralph Shaffer
HIS ATTORNEY

INVENTOR.
JOHN C. BREWER

HIS ATTORNEY

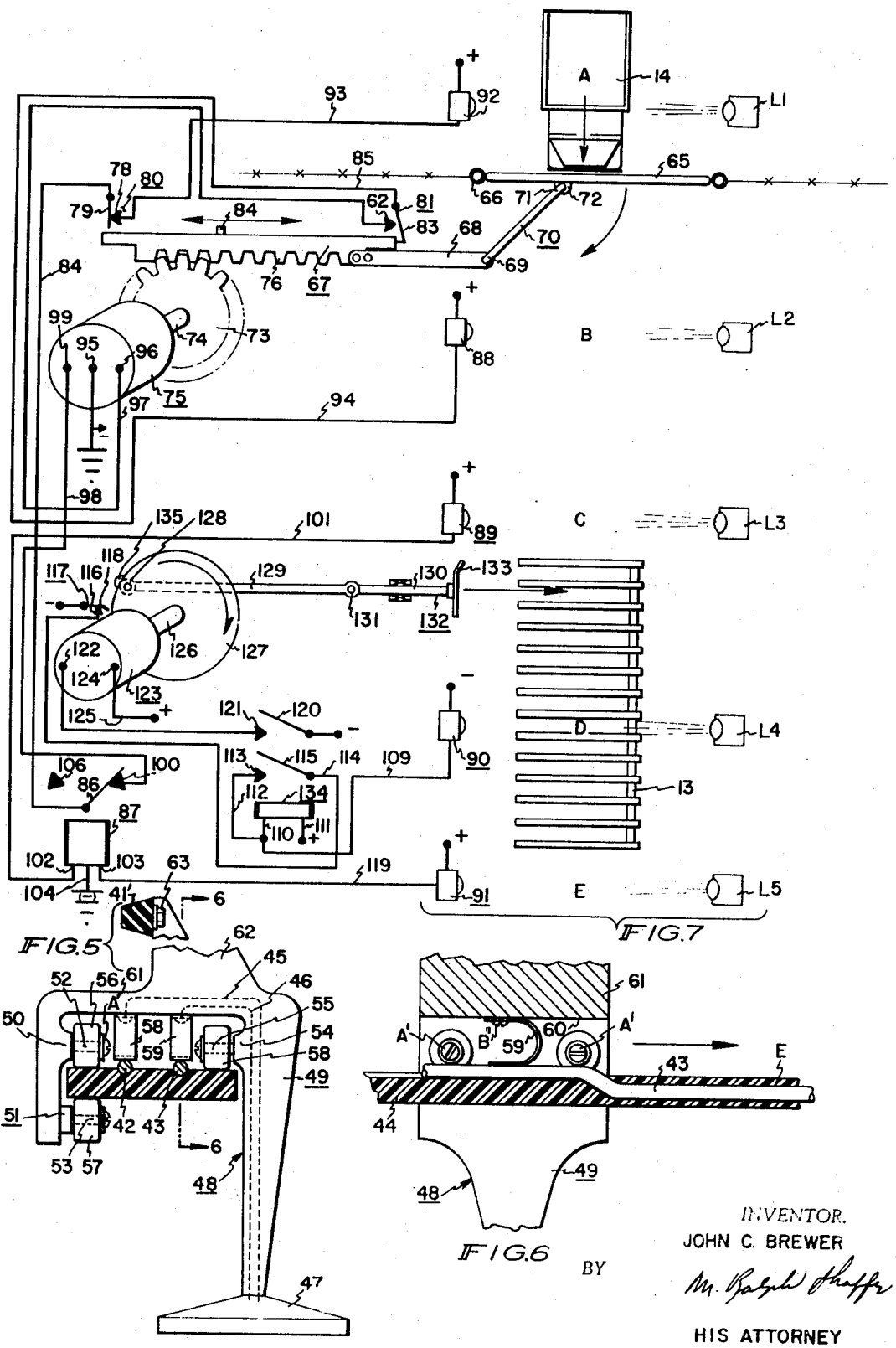

3,660,038

INTEGRATED GARBAGE PROCESSING SYSTEM

This is a division of the inventor's co-pending application entitled Integrated Garbage Processing System and Method, Ser. No. 707,910, filed Feb. 5, 1968 now abandoned.

The present invention relates to fertilizer systems and methods and, more particularly, to a new and improved integrated method and system for processing municipal refuse such as garbage into a useable fertilizer product. The invention includes a provision for incorporation of the system or method with a municipal sewage treatment plant, the latter supplying liquid and sludge phases which are properly useable in the milling and also the mixing stages of the method or system. Means are provided for roasting the resultant slurry to reduce bacteria count, consume cellulose material such as paper, and so forth. Means are provided for recovering metals from the garbage and for processing these independently for delivery in suitable form to commercial users. Suitable collecting means is provided so that dump trucks may easily and safely unload city refuse therein, for processing by the system, in a safe and convenient manner.

In the past cities and towns have had extreme difficulty in disposing of the voluminous amounts from garbage and refuse produced in municipalities each day. One disposal method that has been used is simply in burying the garbage in adjacent land. Another method is simply to deposit garbage in streams and rivers, thereby polluting the same.

Some slight advance has been made in the past in processing certain types of refuse by increasing anerobic bacteria count so as to use the same in some type of a fertilizer product. Attempts in this field, however, have been somewhat unsatisfactory both from an end-product point of view and also from feasibility for a desirably continuous process.

Accordingly, the principal object of the present invention is to provide an improved system and process of an integrated nature for processing municipal garbage into a useable fertilizer product.

A further object is to provide an integrated system and process for processing municipal garbage so as to recover in a convenient manner metals contained therein.

An additional object is to provide an integrated system and process for processing garbage, and which utilizes the municipal treatment plant in that the sludge and liquid phases thereof are separately utilized in the milling and slurry mixing stages in the system and process.

An additional object is to provide in a garbage processing facility a container or bag-making facility which utilizes a portion of the slurry of the facility in making bags to be provided the final bagging facility of the system used.

A further object of the invention is to provide an improved dump facility which provides safe, continuous collection and processing of materials dumped therein by conventional vehicles.

A further object is to provide a system and process for processing garbage wherein the system includes roasting means for reducing the count of unwanted bacteria in the garbage.

The features of the present invention which are believed to be novel are set forth with particularity in the appended claims.

The present invention, both as to its organization and manner of operation, together with further objects and advantages thereof, may best be understood by reference to the following description, taken in connection with the accompanying drawings in which:

FIG. 1, is a diagram, partially in pictorial form and partially in schematic form, of a system incorporating the features of the present invention.

FIG. 1A is a vertical section taken along 1A—1A in FIG. 1.

Figure 3:
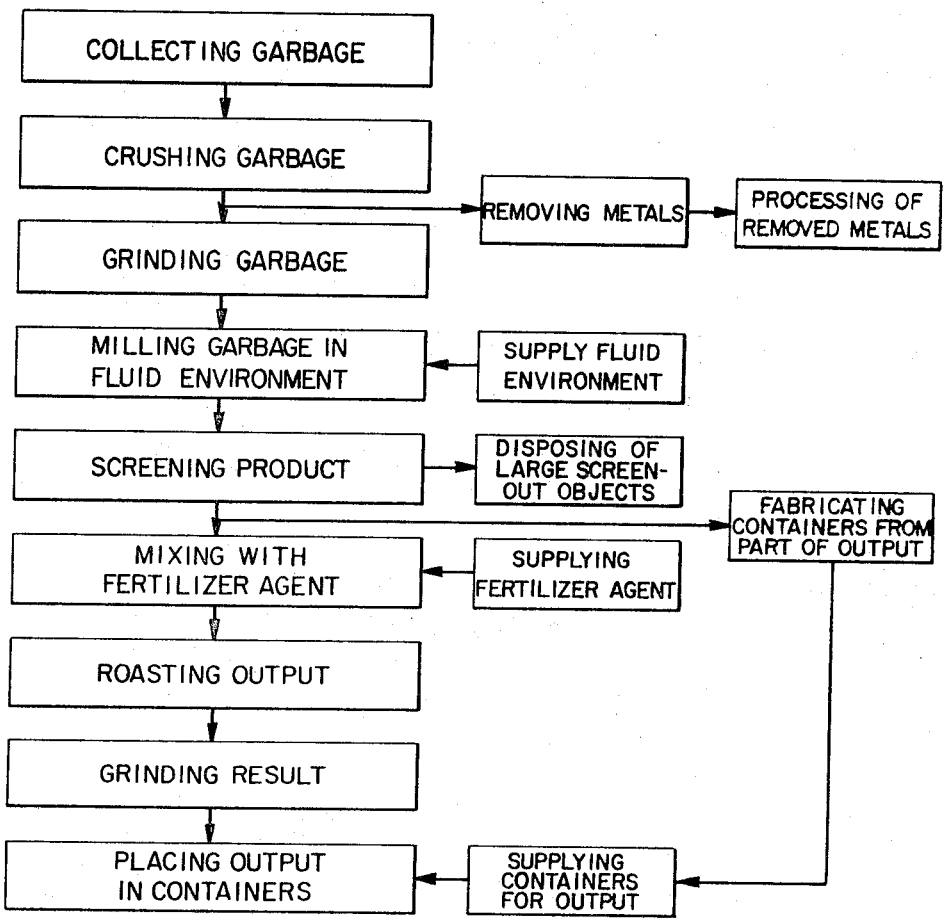

FIG. 3 delineates the complete process, in flow diagram form, of the present invention.

Figure 4:
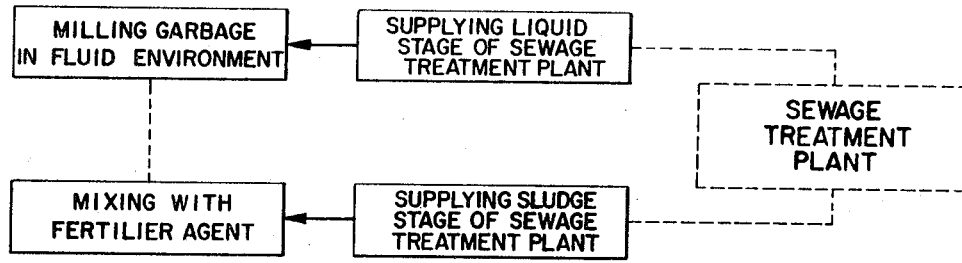

FIG. 4 indicates further delineation of process in FIG. 3 wherein the supplying of liquid and sludge or other fertilizer matter to the milling and mixing steps in the process is provided by a municipal sewage treatment plant.

FIG. 5 is a fragmentary, enlarged section, shown principally in elevation view, of an electromagnet assembly utilized in the metals' recovery stage in the system process.

FIG. 6, is a vertical section taken along the lines 6—6 in FIG. 5.

FIG. 7 is a diagrammatic presentation, principally in schematic form, of a representative, simplified system that can be used in automatically performing certain steps in the described system and method.

In FIG. 1 roadway 10 includes an interruption 11 forming a garbage collection hopper 12. Disposed over hopper 12 is a coarse grate 13 over which dump truck 14 can travel. The forward, terminal end 15 of grate 13 is contiguous with the forward, return extension 16 of roadway 10. Suitable structural means 17 and 18 are provided for supporting the grate 13 at its position shown in FIG. 1A. A cement, supporting encasement is disposed at 19 and includes conveyor means 20 suitably supported for operative movement by structural members 21. A crusher stage 22 preferably includes a pair of crusher rollers 23 which are rotated by motor 24 and oppositely rotating gears 25 and 26 coupled thereto. Shafts 27 and 28 carry the rollers 23, the latter being fixedly keyed thereto. The crusher stage also preferably includes a shredder 30 of conventional form for shredding the material descending from hopper 12. A scraper means 31 includes arm 32 and scraper plate 33 fixedly secured thereto in a conventional manner. Disposed over conveyor belt 20 is a metals' recovery stage 34 which includes motor 35 fixedly secured to stationary structure 36. The motor 35 includes an output shaft 37 having pulley wheel 38 keyed thereto. Journaled, likewise, to fixed structure 36 is a shaft 39 to which idler pulley wheel 40 is keyed. A standard V-belt 41' is placed around the pulley wheel shown and is driven by motor 35 in the direction of the arrows as indicated. Fixedly secured to and beneath the stationary structure 36 is a track member 41 including looped tracks 42 and 43. An insulative base 44 completes the construction and is of a suitable molded configuration such that the tracks 42 and 43 are imbedded at end E of the looped configuration of the track. Being imbedded in a non-conductive material of which the base 44 is made, then there will be no electrical conductivity of the leads 45 and 46, about to be described, which lead to the electromagnet 47. Electromagnet 47 is part of an electromagnet assembly 48 which also includes inverted J-shaped member 49. Member 49 includes bosses 50 and 51 to which are mounted shafts 52 and 53. Boss 54 is likewise an integral part of member 49 and mounts shaft 55 thereto. The roller shafts 52, 53, 55 are for the purpose of journaling rollers 56, 57 and 58 in the positions shown. Representative attachments A' complete the journal construction. Member 49 is preferably made of non-conductive material and includes electrical wipers 58 and 59, the latter being secured by attachments B' to the underside 60 of portion 61 of the member 49. Upstanding portion 62 of member 49 is secured by suitable means 63 to the V-belt 41', thereby assuming a supporting relationship with respect thereto.

Figure 2:
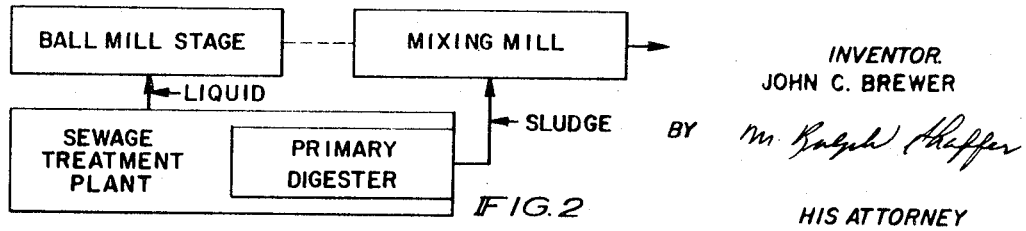
FIG. 2 is a system-subcombination wherein a sewage treatment plant is utilized to supply the liquid and sludge phases to the ball-mill stage and mixing mill of the system shown in FIG. 1.

In FIG. 1 it is seen that the remainder of the system is fed by conveyor belt 20 and include the primary grinding unit, ball-mill stage, screening system, mixing mill, roasting stage, secondary grinding unit, and bagging stage, in this order. The ball-mill stage must be supplied liquid to constitute therein a liquid environment for materials introduced into the feed-end of the ball-mill stage. The mixing mill is an essentially included stage, is of a design which eliminates most of the liquid from the slurry, and may be coupled to a fertilizer agent source such as an independent chemical fertilizer agent supply or even the sludge stage of a sewage treatment plant as is seen in FIG. 2. In the latter event the liquid from the sewage treatment plant may be fed into the ball-mill stage to form a slurry therein. Depending upon the character of the roasting stage, the secondary grinding unit may be optionally employed. Likewise, the bagging stage is optionally included for bagging purposes and will not be necessary where the end product is to be shipped in bulk. Likewise, optionally included is a paper bag facility which draws off a portion of the slurry from the screening system and processes it as in a conventional paper mill for making bags suitable for introduction at the bagging stage of the system. If desired, the screening system may, by truck or suitable conveyor, feed materials not properly forming part of the slurry produced back into the metals' processing stage, the latter being coupled to and fed by the metals' recovery stage 34. Such materials as may be fed back by the screening system are rubber, aluminum, plastics, etc. It is noted that the metals' recovery stage 34 and the metal' processing stage as so labelled constitute a shunting system for shunting out metals as may be recovered from the materials contained on conveyor belt 20. In small plants or small towns and cities it is conceivable that the metals' recovery and metals' processing stages may be eliminated.

The following is a description of the stages in the system of FIG. 1 that have not been previously discussed. As to the metals' processing stage, the same may take the form of a conventional electric furnace which is used to melt down the various metals. Conventionally, these furnaces will use carbon electrodes which produce an electric arc upon contact with the metals. This, in turn, produces heat inside the furnace to melt the metals. Suitable electric furnaces are of standard manufacture, and are made by the General Electric Company and by Westinghouse Corporation, merely by way of example.

The primary grinding unit may, for example, be composed of a series of solid steel wheels mounted on a rotating shaft. On these wheels will be attached metal teeth which rip and tear the garbage into shreds as it is pulled through the stage. The primary grinding unit will reduce the garbage into pieces which are small enough as to be capable of being conveyed into the ball-mill stage.

As to the screening system, screens of course are used very commonly to reduce pieces of garbage or other material which cannot be reduced to slurry. In the present invention the screening system can be designed to screen out items such as rubber, plastics, and so forth, and transport the same in through conveyor or separate trucking means to the metals' processing stage. The heat produced in the metals processing stage is sufficient to burn these items when desired.

Paper bag facilities are in common usage and simply receive a cellulose-containing slurry to process the same into cartons, bags or the like. These are in common manufacturing use and a portion of the slurry from the screening system may be received by the paper bag facility for making suitable containers, such as bags, for supply to the final output of the system where required. Such inclusion in the system will not be needed where the end product is delivered in bulk.

The "mixing" mill, as is typical of the unit described below, is designed to remove or eliminate most if not all of the liquid from the slurry, and will generally, although not necessarily, be used actually to mix an external fertilizer agent with the slurry prior to liquid separation. This will be for the purpose of mixing the slurry coming from the screening system with an external fertilizer agent such as suitable chemical fertilizers or fertilizer additives or even the sludge of a municipal sewage treatment plant. The terms "mixing mill" and "mixing...step" are used herein even though no mixing with an external fertilizer agent actually takes place. The mixing mill when used, may take the form of an Atkins Spiral Classifier, as is presently sold by the Mining & Smelting Supply Company of Colorado. This classifier has two spirals extending into a tank or vat containing sludge, slurry and/or other chemical additives. When the spirals are rotated in one direction they cause a pushing action on the contents which produces a mixing result. When the mixing is completed the spirals are reversed to carry and discharge the mixed solids from the spiral onto a conveyor type belt, there to be conveyed to the roasting stage of the system, while the removed liquid phase is discharged from the classifier top.

The roasting stage preferably comprises a Skinner-type furnace, as presently sold by the Mining & Smelting Supply Company of Colorado above indicated. This furnace is a vertical, cylindrical unit consisting of a series of circular hearths placed one above the other and enclosed in a refractory-lined steel shell. The material to be treated is usually fed to the top hearth for drying. A central shaft rotates rabbles which stir and move the material around and across the hearths, with the material progressing through drop-holes from top to bottom. The most common flow of gas is from bottom to top.

When the dried material reaches the bottom hearth it then will be dumped onto a conveyor type belt for further grinding as by the secondary grinding unit, or simply for dumping into a bulk storage conveyor or storage unit.

A secondary grinding unit may be used to reduce still further the size of the particles coming from the roasting stage, and the bagging unit may be supplied where bagging of the fertilizer end product is desired.

As to the roasting stage, it is preferred that roasting of the included product be done in from 15 to 30 minutes of time at a temperature of from 400° to 800° F. In this way most of the cellulose paper products are incinerated, leaving simply an ash residue free of all bacteria. The heat produced in he furnace will be sufficient to kill all bacteria in the garbage so as to leave, in addition to the ash residue, suitable fertilizer chemicals such as potassium nitrate, potash, and so forth. The ash pressed in the fertilizer will not detract from or otherwise be harmful to the useful effects of the fertilizer output.

FIG. 2 illustrates one type of use of the system of the present invention. Its commonplace useage of the system with the sewage treatment plant of a municipal sewer system. Thus, the primary digester of the sewage treatment plant produce a sludge output and is mixed with the slurry coming from the ball-mill stage in the mixing mill of the system, to enrich the organic content of the fertilizer slurry. Correspondingly, the liquid phase of the sewage, treatment plant can be used to supply the liquid environment in the ball-mill stage, thereby automatically producing a slurry output at the ball-mill stage. It is noted that the secondary digester of the sewage treatment plant can be used simply for water purification purposes, where so desired.

FIG. 3 is a flow sheet of the method or process embodied in the present invention. Steps in the process includes specifically collecting garbage, crushing garbage, grinding garbage, milling garbage in fluid environment, screening the product, mixing with a fertilizer agent, roasting output, grinding the result, and placing the results output in suitable containers. The "mixing step" eliminates the liquid from the slurry, even when there are no external fertilizer agents, such as chemical fertilizers or sewage sludge, supplied. Correspondingly, the "-grinding result" and "placing output in containers" steps, following the roasting output step, may be deleted where the product is to be stored or shipped in bulk and where the roasting output constitutes a fragmented output of some type.

Optional steps of the process comprise the steps of removing and processing metals subsequent to the crushing step, screening-out large sized objects, fabricating containers, and supplying the same at the step of placing output in the containers, etc. As to the steps of supplying fluid environment and supplying a fertilizer agent to the milling step and mixing step, respectively, the same may be completed, as shown in FIG. 4, through use of a sewage treatment plant, the steps including supplying the liquid phase from the sewage treatment plant to the milling step and supplying the sludge stage of the sewage treatment plant to the mixing step. See FIG. 4 in this regard.

The metal recovery section of the processing system are optional, but are preferably included. An embodiment thereof is illustrated in FIGS. 1, 5 and 6. It will be noted that the electromagnet assemblies 48 in passing over conveyor 20 will pick up various materials and drop the same at end E into a certain metals' processing stage. Of course, any type of movement or conveyor system or truck process may be utilized at this point. An important point in connection with this invention is that, preferably, the conductive rails 42 and 43 are imbedded at end E, in the electrically non-conductive base 44, see FIG. 6, so that there will be an automatic dropping of the metallic materials collected by the electromagnet assemblies 48. Conceivably, other types of systems can be used as, for example, where the magnets move and drop their loads only after specific quantities of materials have been collected by these magnets. The present system is deemed preferably, however, in the automatic nature and feasibility of the metals' recovery system, as shown.

An important feature of the present invention is that the system and process can be made, if desired, fully automatic and fully continuous. FIG. 7 illustrates a photocell system by which the passage of dump truck 14 into the dumping area and over grade 11, to proceed out of the area via roadway extension 16, will actuate certain devices for gate opening and closing, for scraper operation, and so forth. The conveyor system in all stages can be in continuous operation, if desired; or separate controls, automatic or manual, may be incorporated in the system. Furthermore, private vehicles can be accommodated by their simply dumping their refuse on to the grate 13 and, if desired, by conveying the metals separately to the metals' processing stage used in the system.

In FIG. 7 gate 65 is hinged at 66 and is openable in a direction to that which is opposite to that shown at 65' in FIG. 1. Both methods of gate opening are possible, of course. Rack gear 67 includes an extension 68 which is pivoted to extremity 69 of link 70. The opposite extremity 71 of link 70 is pivoted to appropriate journal 72 of gate 65. Pinion 73 is keyed to shaft 74 of control motor 75, and the teeth of pinion 73 mesh with the teeth 76 of rack gear 67. Contact 78 and arm 79 compose switch 80, whereas switch 81 is composed of contact 82 and switch arm 83. As is shown in FIG. 7, the switch 81 is open and switch 80 closed in the condition shown for rack gear 67. Rack gear protuberance 84' may be used to selectively engage arm 79, at its lower extremity, so as to open switch 80. This, indeed, is accomplished subsequent to energization of motor 65, to open the gate by pulling gate 65 in the direction of the arrow through link 70 and extension 68. Leads 84 and 85 are respectively connected between switch arms 79 and 83 to arm 86 of bi-stable relay 87 and to the lower terminal of photocell unit 88, as indicated. The upper terminal of photocell unit 88 is maintained at a positive potential as shown. Photocell units 89, 90, 91 and 92 have their upper terminals maintained at the potentials as indicated. The lower terminal of photocell unit 92 is connected to contact 78 by a lead 93. Lead 94 connects lower terminal of photocell unit 88 to switch arm 83. The center terminal 95 are reversing motor 75 is maintained at a ground or negative potential. Terminal 96 of motor 75 is connected by lead 97 to switch contact 62. Lead 98 interconnects motor terminal 99 with contact 100 of bi-stable relay 87. Lead 101 interconnects the lower side of photocell unit 89 with winding terminal 102 of relay 87. Winding terminal 103 is directly connected by lead 119 to the remaining side of photocell 91. The bi-stable relay 87 is grounded at 104, and it will be understood that the windings of the relay whose extremities are found at 102 and 103 will be oppositely wound so that energization on the left-hand side of the relay, as schematically shown, will pull arm 86 to the left to engage dead contact 106; thereafter, an impulse must be received by he right-hand side of the relay so as to pull the arm 86 back to contact with contact 100. All photocell units are strictly conventional and will generally include, as is conventional, suitable relays so that a closed-circuit condition exists through the photocell units to the positive or negative terminals indicated when the light beams from respective lights L1, L2, L3, L4 and L5 are interrupted relative to reception thereof by the respective photocell units 92, 88, 89, 90 and 91. The lower terminal of photocell unit 90 is connected by lead 109 to one side of relay 110. The remaining side of relay 110 is maintained at a positive voltage by lead 111. Lead 112 interconnects contact 113 with lead 110. Lead 114 interconnects relay arm 115 with contact 116 of switch 117. The arm 118 of switch 117 is maintained at a negative reference potential, as seen in FIG. 7. Lead 119 interconnects the lower terminal of photocell unit 91 to terminal 103 of relay 87. Arm 120 is maintained at a negative reference potential, as indicated; contact 121 associated therewith is connected to terminal 122 of motor 123. The remaining terminal 124 is maintained at a positive reference potential via lead 125. Motor 123 includes a shaft 126 which is centrally connected to a cam wheel 127. Cam wheel 127 includes an eccentric pivot 128 which is connected to the receiprocating, connecting rod 129. Connecting rod 129 includes a pivot extremity 131 to pivotally receive actuating arm 130 of scraper unit 132. A scraper blade 133 is securely and rigidly affixed to arm 130. (These correspond to arm 32 and blade 33 in FIG. 1A).

Relay 134 is a conventional two-output-circuit relay, and which is normally open. Again, all circuits through the photocell units 92, 88, 89, and 91 are normally open, but closed upon interruption of the light beams from respective lights L1–L5. As to the scraper-actuating mechanism it will be noted that wheel 127 includes a protuberance 135. Protuberance 135 serves to contact arm 118 of switch 117 so as to open this switch momentarily. However, the inertia of shaft 126 and wheel 127 is purposely chosen so that even though the electrical circuit to drive motor 123 is turned off, the wheel 127 will revolve sufficiently to allow switch arm 118 to re-engage contact 116.

The system shown in FIG. 7 operates as follows: Assume that a dump truck is at position A so as to interrupt the light beam of light L1 to photocell unit 92. In this event the photocell unit, by its conventional construction, electrically closes so as to supply a positive voltage through switch 80 and closed relay arm 86 and contact 100 or relay 107, back to terminal 99 of motor 75. This produces a rotation of shaft 74 and pinion 73 in a counter-clockwise direction so as to drive the rack gear 67 to the left. Such a process continues until protuberance 84' of rack gear 67 engages the lower tip of switch arm 79, to open switch 80. At this point there is a circuit interruption between leads 84 and 93, causing motor 75 to turn off. At this point the truck 14 can be moved forwardly from position A to position B, at which time the light beam from light L2 to photocell unit 88 is interrupted. This closes the circuit of lead 94 to the positive potential of the upper side of photocell unit 88, this in turn completes the circuit through switch 81 (contact 62 is now closed with arm 83), so that the opposite side of motor 75 is energized. This energizes the motor to turn in an opposite direction, to return the rack gear to the right so as to close gate 65. At this point the truck moves to direction to position C so as to close the circuit through photocell unit 89, thereby energizing bi-stable relay 87 on its left side and thus causing relay arm 86 to switch from its position shown in FIG. 7 to contact the dead contact 106. This interrupts the circuit through contact 100 and switch arm 86, so as to interrupt temporarily all circuit connection to terminal 99 of motor 75. Such action prevents any subsequent dump truck at position A from energizing motor 75 so as to open the gate until the first truck has cleared the dump area.

Truck 14 proceeds to position D at which point light emanating from light source L4 is interrupted to its photocell unit 90, thereby closing this circuit and energizing relay 134. Relay 134 thence energizes and locks over its own contacts via contact 114 at arm 115, at the same time closing the circuit across arm 120 and contact 121 to apply negative voltage to terminal 122 of scraper motor 123. At this point the wheel 127 revolves one complete revolution, or substantially so, so as to actuate back-and-forth the scraper blade 133 via the eccentric connection of connecting rod 129 to wheel 127 and the connection of journaled arm 130 to connecting rod 129. Protuberance 135 traverses in a clockwise direction until it opens switch 116, through urging upwardly arm 118 of switch 117. Thus, the negative potential is removed from lead 114. This will operate to de-energize relay 134 unless the truck remains in position D, in which event a voltage potential will be supplied across the primary connections of relay 134. Thus, in the process the vehicle has dumped its load and such other load as has not fallen through the grate 13 in FIG. 1 of its own weight will be pushed (after the truck has passed) by the scraper blade 133 over the side of the grate to fall downwardly into the hopper as seen in FIGS. 1 and 1A. Subsequently, the truck may be moved to position E to energize the opposite side of bi-stable relay 88, thereby indirectly pulling the relay arm 86 to contact the contact 100 and thus completing the circuit to terminal 99 of motor 75. In this way a truck disposed at position A will be capable of opening gate 65, directly or indirectly, depending upon the form the structure may take. This, again, is accomplished through the interruption of the light beam of light source L1 leading to photocell unit 92.

What is accomplished hence in the present invention, is a manually or automaTically operated intermittent or continuous process and/or system for receiving refuse such as garbage from a town or other municipality or series of municipalities, and converting this garbage into a useful fertilizer material.

In summary, then, the process and system comprehend the processing of received garbage into a usable fertilizer product. The end product may comprise merely a soil conditioner, in which some organic or other fertilizer agent is present. Such presence may be constituted merely by the inherent nature of the garbage received or, and preferably, by fertilizer additives and/or sludge from a sewer treatment system with which the present system is preferably incorporated. Provision is made in the system from recovering metals contained in the garbage, where desired. The garbage is processed into a slurry for introduction into the mixing and roasting stages of the system. Most liquid will be eliminated automatically in the mixing stage, and practically all the remaining moisture will be evaporated out of the mixer output at the roasting stage, the roasted product being substantially bacteria-free.

At the mixing mill stage, means are provided for receiving fertilizer additives or even sewage sludge, at this stage, into the slurry to enrich the final fertilizer product. It is deemed essential that a ball-mill stage is used in order to produce the requisite slurry needed. A separate liquid supply is connected at the ball-mill stage performing the slurry at this stage. Preferably the liquid supply is received as liquid from a conventional sewage treatment plant.

Other refinements of the system and the process are possible as, for example, by the inclusion of a paper bag facility as above described, by suitable grinding stages, screening stages, etc.

The term bagging and bags are used herein refer not only to paper bags but also to boxes and other types of containers. Fertilizer end product refers not only to sewage or chemically enriched, slurries, but also simply to garbage slurries wherein no additives are supplied. The crushing stage receiving the garbage initially, see FIG. 1A, will be understood to include crushers as well as crushers and shredders combined in single stage or multi-stage units.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. In a dump collection system, in combination, a collection hopper, grate means disposed over said hopper, said hopper extending laterally beyond a side of said grate means, support means mounted to said hopper and upstanding therefrom to support said side of said grate means, said hopper and grate means being mutually constructed such that a free-fall space exists between said hopper and said side of said grate means, roadway means contiguous with at least one end of said grate means and defining thereat an entrance junction, and means cooperatively disposed with respect to said hopper for processing materials as may be dumped onto and through said grate means into said hopper 2. Structure according to claim 1 wherein said system includes ram means for pushing during an operating cycle such materials as do not fall through said grate means toward and into said free-fall space, over said side of said grate means to fall directly into said hopper, said hopper being so constructed and arranged to so receive such pushed materials also.

3. In a dump collection system, in combination, a collection hopper, grate means disposed over said hopper, said grate means being constructed to support a dump vehicle, roadway means contiguous with at least one end of said grate means and defining thereat an entrance junction, and means cooperatively disposed with respect to said hopper for processing materials as may be dumped into and through said grate means into said hopper, into a useable fertilizer product, wherein said system includes means for pushing debris disposed upon said grate means over a side thereof and into said hopper, gate means operably disposed at the entrance junction of said grate means and said roadway means; first means coupled to said gate means and to said pushing means for automatically opening said gate means upon the presence of a dump vehicle ready to advance toward and on said grate means; second means coupled to and cooperable with said first means for closing said gate means when said dump vehicle is disposed on said grate means and when said pushing means may be operating; actuating means coupled to said first and second means for actuating said pushing means through an operating gate once said dump vehicle has dumped its load onto said grate means; and third means coupled to said first and second means for opening said gate means once said dump vehicle has passed on, the actuating cycle of said pushing means is completed, and a second dump vehicle approaches said grate means for entrance upon said grate means.

4. In a dump collection system, in combination, a truck travel supporting grate structure having opposite sides and opposite ends, roadway means contiguous with said opposite ends of said grate structure, said grate structure being constructed to form a medial truck travel path joining said roadway means, a collection hopper disposed both underneath said grate means and also extending laterally beyond one of said sides thereof, and ram means disposed proximate the remaining side of said grate structure for pushing dump truck deposits as do not fall through said grate means over said one side of said grate structure directly into said hopper means.

* * * * *